Oct. 14, 1958 — J. W. SUTHERLAND — 2,855,836
SOIL STOPPING HARROW TOOTH ATTACHMENT
Filed Feb. 24, 1956
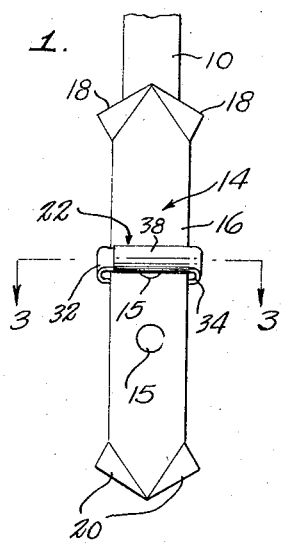
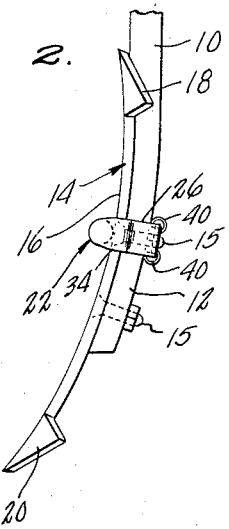
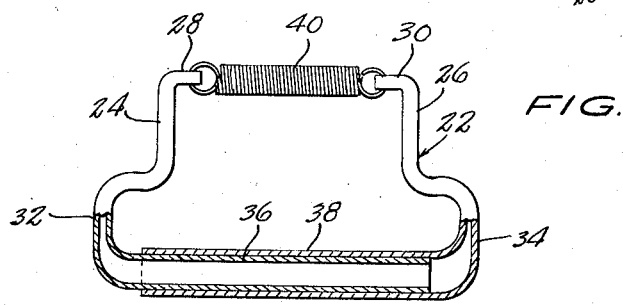
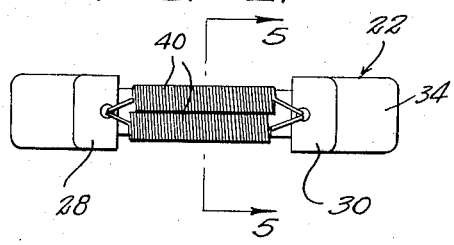
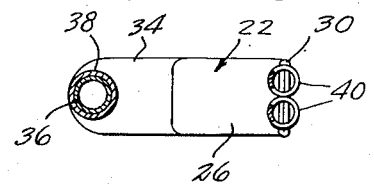
INVENTOR.
JACOB W. SUTHERLAND,
BY McMorrow, Berman & Davidson
ATTORNEYS.

United States Patent Office 2,855,836
Patented Oct. 14, 1958

2,855,836

SOIL STOPPING HARROW TOOTH ATTACHMENT

Jacob W. Sutherland, Romeo, Mich.

Application February 24, 1956, Serial No. 567,652

3 Claims. (Cl. 97—188)

Summarized briefly, the present invention is an attachment for a conventional cultivator or harrow tooth in the form of telescopically related elements extending transversely of the front surface of the harrow tooth in a position to stop soil from passing off the tooth in such a manner as to cover up small corn. The telescopically related elements of the device have rearwardly projecting arms connected in back of the harrow tooth by contractile springs, and due to the telescopic relationship of the members, and due also to the use of the contractile springs, the device can not only be readily slipped onto a harrow tooth, but will grip the same without the requirement of special fastening elements. Further, the arrangement is adapted to cause the device to adjust itself to harrow or cultivator teeth of different widths.

During the cultivating of small corn, the cultivator or harrow teeth are used in pairs, with the teeth of each pair being disposed at opposite sides of the row. Ordinarily, soil turned up by the teeth tends, in many instances, to cover up small corn and this of course is undesirable. At the same time, it is desirable that as much soil as possible be thrown toward the corn, since the growth of the plants is improved by the mounting of as much soft soil as possible along the opposite sides of the plants, for the purpose of covering up small weeds.

One object of the present invention is to provide a harrow tooth attachment that will be particularly designed to effect the deflecting of the soil toward the corn for the purpose of achieving the desirable, weed-covering characteristics mentioned above, while at the same time assuring against covering of the corn.

Another object is to provide a device of the nature referred to which will be self-adjusting to harrow teeth of different widths.

Another object is to form the attachment in such a manner that it will be connectible to the harrow tooth without the requirement of bolts, screws, welds, or other fastening elements, the connecting bolt used for attaching the tooth to its associated support arm cooperating with side-by-side contractile springs to hold the device against movement longitudinally of the tooth from its assigned position.

Another object is to provide an attachment of the character described that can be manufactured at a very low cost, and can be removed and replaced with minimum difficulty and expense.

Other objects will appear from the following description, the claims appended thereto, and from the annexed drawing, in which like reference characters designate like parts throughout the several views, and wherein:

Figure 1 is a front elevational view of a cultivator or harrow tooth equipped with a soil stopper formed according to the present invention;

Figure 2 is a side elevational view of the tooth and stopper as seen from the right of Figure 1;

Figure 3 is an enlarged sectional view through the stopper per se, substantially on line 3—3 of Figure 1;

Figure 4 is a rear elevational view of the stopper on the same scale as Figure 3; and Figure 5 is a sectional view through the stopper on line 5—5 of Figure 4.

Referring to the drawings in detail, the reference numeral 10 designates a depending standard or toothed support arm of conventional shape, having a forwardly curving lower end portion 12 (see Figure 2). A conventional tooth has been generally designated at 14, and is secured fixedly to the curved extension 12, in longitudinally contacting relation therewith, by bolts 15. The tooth, as is usual, curves correspondingly to the standard and projects beyond the lower end of the standard or arm, the tooth in the illustrated example, but not necessarily, having at each of its opposite ends convergent, triangular blades 18, 18 and 20, 20 respectively.

The attachment constituting the present invention has been generally designated at 22 and includes rearwardly projecting arms 24, 26 adapted to extend in contact with opposite sides of the standard 10. At their rear ends, the arms 24, 26 have inwardly projecting ears 28, 30 extending in back of the standard or arm 10 and aligned with one another transversely of said arm.

At their forward ends, arms 24, 26 are integrally formed with outwardly offset extensions 32, 34 respectively extending in contact with the opposite side edges of the tooth 14, and the offset extensions merge, at their forward extremities, into elongated, straight, telescopically related tubular elements 36, 38 of circular cross section (see Figure 5). Said members are of a length such that when the device is connected to a cultivator tooth of regular width, the members are in telescopic relationship over substantially their full lengths as shown in Figure 3, thus providing added rigidity at the front end of the soil stopper and further providing an abutment extending across the front face of the tooth intermediate opposite ends of the tooth for the purpose of stopping the soil from passing off the tooth in a direction such that it would cover up small corn.

Connected between the ears 28, 30 are side by side, parallel, contractile springs 40 (see Figures 4 and 5).

In use of the device, the arms 24, 26 are pulled away from one another, placing the springs 40 under heavier tension, thus to permit the device to be slipped over the lower end of the tooth. The device is moved longitudinally of the tooth to the Figure 1 position of the device, and the springs 40 are extended above and below a selected one of the bolts 15 as shown in Figure 2.

This secures the device in place, against movement longitudinally of the harrow tooth in either direction, while at the same time permitting the device to yield resiliently if, for example, it is struck by a rock or other obstruction.

The device, when attached to the tooth in this position, will have the abutment defined by the telescoped tubular members 36, 38 extending perpendicularly to the length of the harrow tooth. It has been found that this particular position of the abutment is such that the soil passing upwardly along the front face of the tooth will be deflected by the abutment, but will not be thrown away from the row. In other words, the deflection of the soil is such that the soil will not fall onto the small corn and cover the same, as is often the case with cultivator or harrow teeth when they are traveling along opposite sides of the row of corn. At the same time, the soil will still be deflected toward the row of corn, and will be caused to drop at opposite sides of the plants, where it will cover small weeds and thus aid the growth of the plants. This is to be distinguished from an arrangement, for example, in which the abutments would be oblique to the length of the tooth rather than perpendicular thereto, since the oblique disposition of the abutments would tend, if the soil-engaging face of the abutments were faced outwardly from the row, to deflect the soil away from, rather than toward the row of plants.

Whenever it is desired to remove the soil stopper, it is swiftly detached from the harrow tooth, by pulling the arms 24, 26 apart so that the device may be slipped off the arm and tooth, the springs being readily disengaged from the associated bolt 15.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to illustrative of the principles of operation and the means presently devised to carry out said principles, it being considered that the invention comprehends any minor changes in construction that may be permitted within the scope of the appended claims.

What is claimed is:

1. The combination, with a harrow tooth and support arm therefor, of a soil-stopping attachment comprising a closed loop completely encircling the tooth and arm and including a pair of arm members extending at opposite sides of the tooth and support arm, a pair of telescopically, slidably connected abutment members on one end of and extending transversely between said arm members in front of the tooth, and resiliently contractile means connected transversely between the arm members at the other ends thereof in back of the support arm to contract the loop widthwise into gripping engagement with the tooth and arm.

2. The combination, with a wide harrow tooth of flat cross section and with a support arm for the tooth disposed in back of and formed to a width less than that of the tooth, of a soil-stopping attachment comprising a closed loop completely encircling the tooth and arm including a pair of arm members extending at opposite sides of the tooth and support arm and having outwardly offset forward end portions embracing the tooth, a pair of telescopically, slidably connected abutment members extending transversely between said forward end portions in front of the tooth, and resiliently contractile means connected transversely between the arm members at the rear ends thereof in back of the support arm to contract the loop widthwise into gripping engagement with the tooth and arm.

3. The combination, with a wide harrow tooth of flat cross section and with a support arm for the tooth disposed in back of and formed to a width less than that of the tooth, of a soil-stopping attachment comprising a closed loop completely encircling the tooth and arm and including a pair of arm members extending at opposite sides of the tooth and support arm and having outwardly offset forward end portions embracing the tooth, a pair of telescopically, slidably connected abutment members extending transversely between said forward end portions in front of the tooth, and resiliently contractile means connected transversely between the arm members at the rear ends thereof in back of the support arm to contract the loop widthwise into gripping engagement with the tooth and arm, said resiliently contractile means comprising a pair of expansion springs connected between said rear ends of the arm members in side-by-side, normally longitudinally contacting relation, the support arm including at least one connecting bolt for securing the harrow tooth to the support arm, said bolt including a portion projecting rearwardly from the support arm and the springs being resiliently yieldable transversely thereof in a direction away from each other to receive the projecting portion of the bolt.

References Cited in the file of this patent

UNITED STATES PATENTS 274,132   McVey et al. _____ Mar. 20, 1883

FOREIGN PATENTS 69,246   Norway _____ May 14, 1945